United States Patent Office 3,075,877
Patented Jan. 29, 1963

3,075,877
ANTICOCCIDIAL COMPOSITIONS COMPRISING 5-NITRO - 2 - FURALDEHYDE CYANOACETYL OR DICHLOROACETYL-HYDRAZONE
Cornell Alvin Johnson, Norwich, N.Y., assignor to The Norwich Pharmacal Company, a corporation of New York
No Drawing. Filed Dec. 13, 1960, Ser. No. 75,468
5 Claims. (Cl. 167—53.1)

This invention relates to veterinary medicine. More particularly it is concerned with new anticoccidial compositions and the control of coccidiosis through their use.

It is well known that coccidiosis is a prevalent and costly disease, especially in poultry. If left unchecked, the mortality and morbidity resulting from it so decimate poultry flocks that a severe economic loss is suffered by the owner as well as a diminution in food supply to the consumer.

Various measures have been resorted to with rather notable success to counteract the ravages of coccidiosis. That these steps have not wholly solved the problem is reflected by the continued search for agents and practices which may be employed to eradicate the causative organism and at the same time satisfy other facets of the problem such as tolerability of a coccidiostat when administered over protracted time periods; drug residua up to and at slaughtering time; feed conversion and efficiency as influenced by drug administration and immunity development in the presence of drug.

This invention provides compositions containing certain nitrofurans represented by the formula:

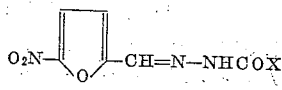

in which

X represents a radical selected from the group consisting of cyanomethyl and dichloromethyl as the active ingredient.

A particular and preferred embodiment of it comprehends combatting coccidiosis caused by *Eimeria tenella* by combining the active ingredient with the feedstuff administered to poultry so that the feedstuff serves as a facile and inert carrier. Such a composition is highly effective as a coccidiostat; confers generally beneficial effect upon growth and development of the birds; is well tolerated and substantially non-toxic at effective levels; shows minimal drug residua and permits development of natural immunity during its administration.

In accordance with this invention the active ingredient is intimately admixed with those carriers commonly used in the poultry field such as ground oyster shells, Attapulgus clay, commercial poultry feeds, urea, corn meal, ground corn, citrus meal, fermentation residues and distillers' dried grains. The admixture of the active ingredient with such carriers is readily accomplished by commonly employed techniques such as tumbling, grinding and stirring. It is possible in this way in the practice of this invention to prepare compositions varying in concentration of active ingredient as may be indicated by particular needs or desires. Concentrates or premixes may, if desired, be prepared containing 1% to 25% or more of the active ingredient for dilution with poultry rations to provide effective drug levels of from 0.008% to 0.02%.

The nitrofurans serving as active ingredients in the compositions of this invention may be readily prepared. Fundamentally their preparation involves bringing together reactants leading to the formation of a hydrazone; viz., a carbonyl compound and a hydrazine followed by treatment with a reactive agent such as an acyl halide, if necessary; as illustrated by the following specific depiction of the preferred preparation of each of the active ingredients employed in this invention:

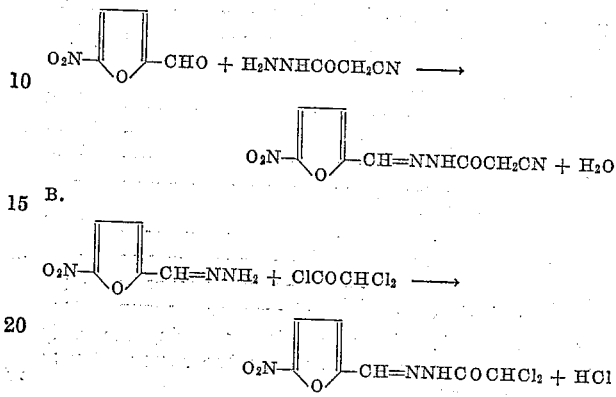

The reaction of A may be applied to the production of the end product of B by substitution of dichloroacetylhydrazide. Similarly the reaction of B may be applied to the production of the end product of A by substitution of cyanoacetylchloride. In carrying out the reaction a solvent inert to the reactants is advantageously employed as the reaction medium. When the reactants are susceptible to hydroxylic solvents, non-polar vehicles such as benzene, chloroform, dioxane and the like are preferable. When the reactants are inert to hydroxylic solvents, the alcohols such as methanol, ethanol and isopropanol, and water or mixtures thereof may be employed. To insure completeness and to speed up the reaction, heat may be supplied to the reaction mixture. The solid end product of the reaction is filtered, dried, and may be recrystallized, if desired, from suitable solvents such as nitromethone, ethanol, dioxane, dimethylsulfoxide and dimethylformamide or mixtures thereof.

In order that this invention may be readily available to those skilled in the art the following illustrative examples are supplied:

EXAMPLE I

*5-Nitro-2-Furaldehyde Dichloroacetylhydrazone*

A suspension of 51 g. (0.33 mole) of 5-nitro-2-furaldehyde hydrazone in 625 ml. of dry benzene is treated dropwise with 48.5 g. (0.33 mole) of dichloroacetyl chloride in 100 ml. of dry benzene during 5 minutes with stirring. After stirring for 10 minutes the mixture is heated at reflux temperature for 5 minutes; cooled, and the deposited solid filtered. This solid is recrystallized from 875 ml. of ethanol, using charcoal, and filtering while hot. The filtrate is cooled and the solid which is deposited is filtered. The amount of 5-nitro-2-furaldehyde dichloroacetylhydrazone obtained is 26 g. (30% yield) (M.P. 203–205°) analysis: C=31.64%; H=1.99%; N=15.78%.

EXAMPLE II

*5-Nitro-2-Furaldehyde Cyanoacetylhydrazone*

Cyanoacetylhydrazide (16.32 g.) (0.165 mole) is dissolved in a mixture of 200 ml. of water and 200 ml. of alcohol and treated with a solution of 25 g. (0.177 mole) of 5-nitro-2-furaldehyde in 200 ml. of alcohol. The clear solution after several minutes stirring on the steam bath deposits a yellow solid. After heating 10 minutes the mixture is cooled and the solid filtered and rinsed with 50% alcohol. The yield is 32 g. (87.5%) M.P. 195° dec. The product may be recrystallized from a mixture of 500 ml. of alcohol and 230 ml. of nitromethane using celite filtering aid.

EXAMPLE III

A medicated poultry feed is prepared by blending 0.011% by weight of the compound of Example I in a basic poultry ration consisting of:

| | Parts by weight |
|---|---|
| Ground yellow corn, medium grind | 1200.0 |
| Fish meal (60%) | 100.0 |
| Soy bean oil meal soluble (40%) | 500.0 |
| Mineral supplement: | |
| Salt | 10.0 |
| Magnesium sulfate | 0.5 |
| Ground limestone | 20.0 |
| Bone meal | 25.0 |
| Vitamin supplement: | |
| Dried whey | 25.0 |
| Dehydrated alfalfa meal | 50.0 |
| $D_3$ (3000 $D_3$/gm.) | 0.5 |
| Feeding oil (3000 A/gm.) | 2.0 |

Such a feed is offered to chickens during the early stages of growth; viz., 1–8 weeks, when susceptibilty to disease is greatest.

A similar feed can be prepared containing the compound of Example II.

What is claimed is:

1. A composition having anticoccidial properties upon administration to poultry comprising the combination of about 0.008% to about 0.02% by weight thereof of a chemical compound represented by the formula:

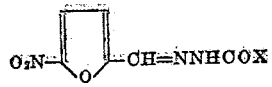

in which
X represents a radical selected from the group consisting of cyanomethyl and dichloromethyl and poultry feedstuff.

2. A composition according to claim 1 wherein the chemical compound is 5-nitro-2-furaldehyde cyanoacetylhydrazone in the amount of 0.011%.

3. A composition according to claim 1 wherein the chemical compound is 5-nitro-2-furaldehyde dichloroacetylhydrazone in the amount of 0.011%.

4. A concentrate adapted to be combined in a poultry feedstuff to provide a composition having anticoccidial properties upon administration to poultry comprising the combination of from about 1% to about 25% by weight thereof of a chemical compound represented by the formula:

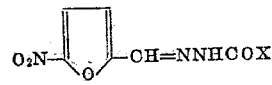

in which
X represents a radical selected from the group consisting of cyanomethyl and dichloromethyl and a nutrient carrier selected from the group consisting of ground oyster shells, commercial poultry feeds, urea, corn meal, ground corn, citrus meal, fermentation residues and distillers' dried grains.

5. The method of combatting coccidiosis which comprises administering to poultry a feedstuff having combined therewith from about 0.008% to about 0.02% by weight thereof of a chemical compound represented by the formula:

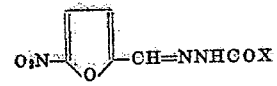

in which
X represents a radical selected from the group consisting of cyanomethyl and dichloromethyl.

References Cited in the file of this patent

Mukherjee: J. of Pharmacy and Pharmacology, vol. 7, No. 1, January 1955, pages 35–38 (particularly pages 35 and 37).